Patented Dec. 19, 1950

2,535,006

UNITED STATES PATENT OFFICE 2,535,006

2-OXO-5-CYANO-4-IMIDAZOLINECARBON-AMIDE, SALTS THEREOF, AND THEIR PREPARATION

David W. Woodward, Wilmington, Del., assignor to E. I. du Pont de Nemours & Company, Wilmington, Del., a corporation of Delaware No Drawing. Application April 5, 1950, Serial No. 154,203

6 Claims. (Cl. 260—309.2)

This invention relates to new organic nitrogen-containing compounds and to methods for preparing them.

Many types of cyclic organic compounds containing nitrogen in the ring are known. Some are used in the dyestuffs and pharmaceutical fields and as intermediates in the preparation of other useful compounds. One group of such compounds is the imidazolones. The preparation of these compounds involves complicated multi-step reactions involving costly and difficult-to-obtain intermediates, particularly if compounds containing functional groups are desired. So far as is known, compounds of this type which contain both a cyano group and a primary-amido group as the sole substituents have not been prepared heretofore.

It is an object of this invention to provide new organic nitrogen-containing compounds and methods for their preparation. A further object is to provide new cyclic organic compounds containing nitrogen in the ring and a cyano group and a primary-amido group as the sole substituents, hydrogen not being considered a substituent. Other objects will appear hereinafter.

These objects are accomplished by the reaction product of hydrogen cyanide tetramer (believed to be aminoiminosuccinonitrile or diaminomaleonitrile) with carbon dioxide. It has now been found that hydrogen cyanide tetramer reacts with carbon dioxide in equimolar proportions in water solution at a temperature of from 50° to 150° C. and under pressures from atmospheric to 2500 lb./sq. in. to give a good yield of a solid product having a molecular formula $C_5H_4O_2N_4$. This compound is 2-oxo-5-cyano-4-imidazolinecarbonamide, i. e.,

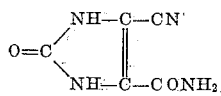

As can be seen this compound contains one cyano group and one carbamyl group as the sole substituents—hydrogen not being considered a substituent. As indicated by the molecular formula, $C_5H_4O_2N_4$, the compound represents the addition of one mole of carbon dioxide to one mole of hydrogen cyanide tetramer.

This invention includes in addition to the 2-oxo-5-cyano-4-imidazolinecarbonamide the salts thereof, e. g., the ammonium, amine, alkali metal, and alkaline earth metal salts thereof. These salts are formed through replacement of one or both of the hydrogens in the imidazoline nucleus.

The preparation and properties of the hydrogen cyanide tetramer used in this invention are disclosed in my Patent No. 2,499,441 issued March 7, 1950. Briefly this process consists of heating hydrogen cyanide at temperatures of from 0° to 100° C. and pressures of from atmospheric to 100 lbs./sq. in. in the presence of insoluble, solid, basic-reacting catalysts, such as an alkaline modified alumina, under anhydrous conditions and continuously removing from the reaction zone the hydrogen cyanide tetramer formed.

The following example, in which parts are by weight, is submitted to illustrate but not to limit this invention:

Example

A mixture of 40 parts of hydrogen cyanide tetramer, 100 parts of water and 75 parts of gaseous carbon dioxide is introduced into a stainless steel bomb having an internal volume equivalent to 450 parts of water. The bomb is sealed and the contents heated with agitation under autogenous pressure at 100° C. for four hours. The contents of the bomb are cooled to 10° C., the bomb opened and the reaction mixture removed and filtered. The dark colored solid thus obtained is dissolved in 2,000 parts of boiling water, decolorizing charcoal added, and the mixture filtered hot. The filtrate is cooled to 10° C. and the white crystalline precipitate thus formed is removed by filtration and dried. There is obtained 49 parts of 2-oxo-5-cyano-4-imidazoline-carbonamide as light tan crystals which decompose upon heating to 300° C.

Anal. Calc'd. for $C_5H_4O_2N_4$: C, 39.47%; H, 2.63%; N, 36.85%.

Found: C, 39.01%; H, 2.81%; N, 36.97%.

This compound dissolves readily in warm sodium bicarbonate solution to form a sodium salt (molecular formula $C_5H_3O_2N_4Na.2H_2O$) which separates readily upon cooling the solution.

Anal. Calc'd. for $C_5H_3O_2N_4Na.2H_2O$: Na, 10.95%; N, 26.6%.

Found: Na, 11.23%; N, 26.0%.

A sample of the 2-oxo-5-cyano-4-imidazolinecarbonamide is dissolved in dilute ammonium hydroxide and the solution evaporated to dryness. The ammonium salt is thus obtained as a white powder.

A 1 part sample of the 2-oxo-5-cyano-4-imidazolinecarbonamide is suspended in 10 parts of 60° C. water and sufficient triethylamine added to effect solution. The warm solution is cooled to crystallize the triethylamine salt. The latter is removed by filtration, dried, and finally obtained as a white powder.

These salts are derived from the original compound by replacement of one of the hydrogen atoms respectively with an atom of sodium, the $NH_4$ (ammonium) radical, and the $(C_2H_5)_3NH$ radical. Other weakly alkaline reactants than the above sodium bicarbonate solution can be used, for instance, relatively dilute solutions of potassium hydroxide, calcium hydroxide, magnesium hydroxide, other alkylamines, etc., thus preparing the corresponding alkali metal (potassium), alkaline earth metal (calcium and magnesium), and amine (ammonium) salts.

Although gaseous carbon dioxide was pressured into the reactor in the example, it is to be understood that other sources of carbon dioxide may be used. For instance, the desired amount of carbon dioxide may be added to the reactor in the form of solid carbon dioxide. However, it is essential that no alkali be present as the hydrogen cyanide tetramer is rapidly decomposed in the presence of even mildly alkaline conditions. Thus the reaction must be carried out under non-alkaline conditions.

Although the reaction used in preparing the carbonitrile of this invention can be carried out at atmospheric pressure by passing carbon dioxide through a solution of hydrogen cyanide tetramer (diaminomaleonitrile or aminoiminosuccinonitrile) in water, the reaction is slow and the yields of product are low. Hence, it is preferred to operate at carbon dioxide pressures in the range of 50 to 500 lbs./sq. in. to insure an adequate concentration of the carbon dioxide reactant. The reaction proceeds best in the temperature range of 50-150° C. At lower temperatures, although the reaction proceeds smoothly, it does so only slowly while at higher temperatures some decomposition of the diaminomaleonitrile or aminoiminosuccinonitrile raw material occurs. This reaction can be carried out in a continuous or batch process. Also, if desired the reaction can be carried out in a reverse manner to that illustrated by the example, i. e., adding the hydrogen cyanide tetramer to the carbon dioxide reactant instead of the reverse.

The new compound of this invention, i. e., 2-oxo-5-cyano-4-imidazolinecarbonamide can be readily converted to 2-oxo-4,5-imidazolinedicarbonamide by hydrolysis with sulfuric acid, by treatment with aqueous hydrogen peroxide under alkaline conditions followed by acidification, or by alkaline hydrolysis followed by acidification. In the latter two instances, the product from the first reaction is the sodium salt of the dicarbonamide. Acidification readily converts this salt to the free diamide. The properties of this 2-oxo-4,5-imidazolinedicarbonamide and its preparation by another route involving the condensation between phosgene and hydrogen cyanide tetramer are disclosed in greater detail in my copending application Serial No. 115,951, filed September 15, 1949.

The 2-oxo-5-cyano-4-imidazolinecarbonamide of this invention can also be readily converted into several other important chemical intermediates through reaction involving the replacement of the hydrogen atoms of the extranuclear carbamyl group as well as those in the imidazoline nucleus. Examples of such conversions include acylation with organic acids, acid halides or anhydrides and alkylation with alkyl esters such as the alkyl halides or the alkyl esters of strong, poly-basic, oxygen containing, mineral acids, e. g., dimethyl sulfate.

The hydrogen atoms of the ring nitrogens as has been pointed out in the example are also capable of replacement through salt formation with weakly alkaline reactants. These hydrogen atoms on the nitrogens in the imidazoline ring are also reactive with formaldehyde under alkaline conditions to form dimethylol derivatives. In fact, one important use of the new product of this invention, i. e., 2-oxo-5-cyano-4-imidazolinecarbonamide as well as its alkali metal and alkaline earth metal salts, is their reaction with formaldehyde and methylol compounds to form resins which may be cured or set by heating especially in the presence of traces of acidic catalysts. These resins are hard, clear, colorless and water-insoluble and can be used advantageously in many applications such as in thermosetting molding compositions, textile treating compositions, e. g., for shrinksetting rayon, etc. Another important use of the hydrogen cyanide tetramer-carbon dioxide reaction product is in the preparation of dyes and pigments, since on treatment with aromatic diazonium compounds in mildly alkaline solution yellow and red colored products are formed. In addition the compound is a useful intermediate in the synthesis of pharmaceutically active chemicals.

This application is a continuation-in-part of application Serial No. 93,846, filed May 17, 1949, now abandoned.

As many apparently widely different embodiments of this invention may be made without departing from the spirit and scope thereof it is to be understood that this invention is not limited to the specific embodiments thereof except as defined in the appended claims.

I claim:

1. A chemical compound selected from the class consisting of 2-oxo-5-cyano-4-imidazolinecarbonamide and its alkali metal, alkaline earth metal, amine and ammonium salts.

2. The chemical compound 2-oxo-5-cyano-4-imidazolinecarbonamide.

3. An alkali metal salt of 2-oxo-5-cyano-4-imidazolinecarbonamide.

4. A sodium salt of 2-oxo-5-cyano-4-imidazolinecarbonamide.

5. A process for the preparation of 2-oxo-5-cyano-4-imidazolinecarbonamide which comprises reacting hydrogen cyanide tetramer with carbon dioxide under non-alkaline conditions at a temperature of from 50° to 150° C. and under a pressure from atmospheric to 2500 lbs./sq. in.

6. A process for the preparation of 2-oxo-5-cyano-4-imidazolinecarbonamide which comprises reacting hydrogen cyanide tetramer with carbon dioxide under non-alkaline aqueous conditions at a temperature of from 50° to 150° C. and under a pressure from 50 to 500 lbs./sq. in.

DAVID W. WOODWARD.

No references cited.